(12) United States Patent
Wang et al.

(10) Patent No.: US 11,372,503 B2
(45) Date of Patent: Jun. 28, 2022

(54) TOUCH DISPLAY DEVICE AND METHOD FOR TOUCH DETECTION

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianting Wang, Beijing (CN); Jianzi He, Beijing (CN); Boxiao Lan, Beijing (CN); Rui Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 370 days.

(21) Appl. No.: 16/490,256

(22) PCT Filed: Nov. 26, 2018

(86) PCT No.: PCT/CN2018/117419
§ 371 (c)(1),
(2) Date: Aug. 30, 2019

(87) PCT Pub. No.: WO2019/205615
PCT Pub. Date: Oct. 31, 2019

(65) Prior Publication Data
US 2021/0365173 A1 Nov. 25, 2021

(30) Foreign Application Priority Data

Apr. 24, 2018 (CN) .......................... 201810373156.2

(51) Int. Cl.
*G06F 3/041* (2006.01)
*G06F 3/14* (2006.01)

(52) U.S. Cl.
CPC ........ *G06F 3/04186* (2019.05); *G06F 3/0416* (2013.01); *G06F 3/1423* (2013.01)

(58) Field of Classification Search
CPC ............... G06F 3/04186; G06F 3/1423; G06F 2203/04803; G06F 3/0416
See application file for complete search history.

(56) References Cited

U.S. PATENT DOCUMENTS

2014/0152576 A1* 6/2014 Kim ...................... G06F 3/0416
345/169
2015/0097781 A1 4/2015 Lee et al.
(Continued)

FOREIGN PATENT DOCUMENTS

CN 102566845 A 7/2012
CN 103049131 A 4/2013
(Continued)

OTHER PUBLICATIONS

Wu et al., Machine Translation of Foreign Patent Document CN 106933403 A, Splicing Touch Screen Apparatus and Touch Detection Method for Touch Screens Thereof, Aug. 7, 2017, pp. 1-6 (Year: 2017).*
(Continued)

*Primary Examiner* — Amr A Awad
*Assistant Examiner* — Maheen I Javed
(74) *Attorney, Agent, or Firm* — Brooks Kushman P.C.

(57) ABSTRACT

A touch display device and a method for touch detection are provided. The touch display device is formed by at least two spliced touch screens, and includes an obtaining module, configured to acquire report data of at least one touch screen of the touch display device, where the report data is generated by the at least one touch screen when the at least one touch screen is touched by a user; and a processing module, configured to perform coordinate conversion according to a
(Continued)

splicing state and the report data of the touch screen sending the report data, to obtain at least one output coordinate corresponding to an entire display area of the touch display device.

18 Claims, 5 Drawing Sheets

(56) References Cited

U.S. PATENT DOCUMENTS

| | | | |
|---|---|---|---|
| 2015/0103014 A1 | 4/2015 | Kim et al. | |
| 2015/0193077 A1* | 7/2015 | Gao | G06F 3/0482 345/173 |
| 2018/0329572 A1* | 11/2018 | Gupta | G06F 3/0416 |

FOREIGN PATENT DOCUMENTS

| | | |
|---|---|---|
| CN | 105159593 A | 12/2015 |
| CN | 106648408 A | 5/2017 |
| CN | 106933403 A | 7/2017 |
| CN | 107368271 A | 11/2017 |
| CN | 108572766 A | 9/2018 |

OTHER PUBLICATIONS

First Office Action for Chinese Application No. 201810373156.2, dated Oct. 21, 2019, 10 Pages.
International Search Report and Written Opinion for Application No. PCT/CN2018/117419, dated Feb. 22, 2019, 10 Pages.

* cited by examiner

TOUCH DISPLAY DEVICE AND METHOD FOR TOUCH DETECTION

CROSS-REFERENCE TO RELATED APPLICATIONS

This application is the U.S. national phase of PCT Application No. PCT/CN2018/117419 filed on Nov. 26, 2018, which claims priority to Chinese Patent Application No. 201810373156.2 filed on Apr. 24, 2018, which are incorporated herein by reference in their entireties.

TECHNICAL FIELD

The present disclosure relates to the field of touch display technologies, in particular to a touch display device and a method for touch detection.

BACKGROUND

With the rapid development of display technologies, an application scope of large area display has become wider, and the large area display has become a part of our life.

In the related technologies, some large area display devices are each formed by splicing multiple independent screens, and currently, it is urgent to realize a touch control function for such large area display devices.

SUMMARY

In one respect, embodiments of the present disclosure provide a touch display device, which is formed by at least two spliced touch screens, and the touch display device includes:

an obtaining module, configured to acquire report data of at least one touch screen of the touch display device, wherein the report data is generated by the at least one touch screen when the at least one touch screen is touched by a user; and a processing module, configured to perform coordinate conversion according to a splicing state and the report data of the touch screen sending the report data, to obtain at least one output coordinate corresponding to an entire display area of the touch display device.

In some embodiments of the present disclosure, the processing module is configured to:

obtaining the corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

In some embodiments of the present disclosure, the touch display device further includes:

a configuration module, configured to configure identification information for each touch screen of the touch display device before the report data of the at least one touch screen of the touch display device is obtained; and the processing module is configured to determine, according to the identification information of the touch screen to which the report data belongs, a splicing position of the touch screen, and perform coordinate conversion, according to the report data and the splicing position of the touch screen to which the report data belongs, to obtain at least one output coordinate.

In some embodiments of the present disclosure, the touch display device further includes:

an output module, configured to convert the output coordinate into a data format compatible with a control board, and then output to the control board such that the control board executes a touch operating instruction corresponding to the output coordinate;

where the control board pre-stores a mapping relationship between an output coordinate and a touch operating instruction, and determines the touch operating instruction corresponding to the output coordinate according to the mapping relationship, and executes the touch operating instruction.

In some embodiments of the present disclosure, the at least two touch screens of the touch display device are connected to each other in series, and each of the at least two touch screens is configured with one obtaining module and one processing module, and the output module includes a hub connecting the processing modules of the at least two touch screens.

In some embodiments of the present disclosure, the at least two touch screens of the touch display device are connected to each other in parallel, and the obtaining module, the processing module and the output module are implemented as a microprocessor connected with the at least two touch screens.

Embodiments of the present disclosure further provide a method for touch detection, applied to a touch display device formed by at least two spliced touch screens, and the method for touch detection includes:

obtaining report data of at least one touch screen of the touch display device, wherein the report data is generated by the at least one touch screen when the at least one touch screen is touched by a user; and performing coordinate conversion according to a splicing state and the report data of the touch screen sending the report data, to obtain at least one output coordinate corresponding to an entire display area of the touch display device.

In some embodiments of the present disclosure, the performing coordinate conversion according to a splicing state and the report data of the touch screen sending the report data, to obtain at least one output coordinate corresponding to an entire display area of the touch display device includes:

obtaining the corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

In some embodiments of the present disclosure, the method for touch detection further includes:

configuring identification information for each touch screen of the touch display device before the report data of the at least one touch screen of the touch display device is obtained;

where the performing coordinate conversion according to a splicing state and the report data of the touch screen includes:

determining, according to the identification information of the touch screen to which the report data belongs, a splicing position of the touch screen, and performing coordinate conversion, according to the report data and the splicing position of the touch screen to which the report data belongs, to obtain at least one output coordinate.

In some embodiments of the present disclosure, the method for touch detection further includes:

converting the output coordinate into a data format compatible with a control board and then outputting to the control board such that the control board executes a touch operating instruction corresponding to the output coordinate;

where the control board pre-stores a mapping relationship between an output coordinate and a touch operating instruction, determines the touch operating instruction corresponding to the output coordinate according to the mapping relationship, and executes the touch operating instruction.

In some embodiments of the present disclosure, the at least two touch screens of the touch display device are connected to each other in series; the performing coordinate conversion according to a splicing state and the report data of the touch screen sending the report data includes: performing, by the touch screen locally, the coordinate conversion according to the report data of the touch screen.

In some embodiments of the present disclosure, the at least two touch screens of the touch display device are connected to each other in parallel, and the touch display device further includes a processor connected with the at least two touch screens; the obtaining report data of at least one touch screen of the touch display device includes: collecting, by the processor, report data of each of the at least two touch screens; and the performing coordinate conversion according to a splicing state and the report data of the touch screen sending the report data includes: performing, by the processor, the coordinate conversion.

In addition, embodiments of the present disclosure provide a touch display device, formed by at least two spliced touch screens, which includes: a processor, a memory, and a program stored in the memory and executable by the processor, and the method for touch detection according to the embodiments of the present disclosure described above is implemented, when the program is executed by the processor.

Further, embodiments of the present disclosure provide a computer readable storage medium having a program stored thereon, and the method for touch detection according to the embodiments of the present disclosure described above is implemented, when the program is executed by a processor.

DETAILED DESCRIPTION

In order to make technical problems to be solved, technical solutions and advantages of the present disclosure clearer, specific embodiments will be described in detail hereinafter in conjunction with drawings. In the following description, specific details such as detailed configurations and components are provided merely to assist in a comprehensive understanding of the embodiments of the present disclosure. Therefore, it should be clear to those skilled in the art that various changes and modifications can be made to the embodiments described herein without departing from the scope and spirit of the present disclosure. In addition, descriptions of known functions and configurations are omitted for clarity and conciseness.

It should be understood that, "one embodiment" or "an embodiment" throughout the specification means that specific features, structures, or characteristics relating to an embodiment are included in at least one embodiment of the present disclosure. Therefore, "in one embodiment" or "in an embodiment" appearing throughout the specification does not necessarily refer to the same embodiment. Furthermore, these specific features, structures, or characteristics may be combined in one or more embodiments in any suitable manner.

In various embodiments of the present disclosure, it should be understood that, a size of each sequence number in the following processes does not mean an execution order, and an execution order of each process should be determined based on a function and an internal logic of the process, and should not be construed as limiting of an implementation process of the embodiment of the present disclosure.

For a spliced display device, embodiments of the present disclosure provide a touch detection solution, which can realize a touch function on the spliced display device.

Figure 1:
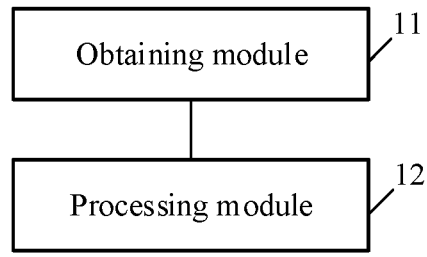
FIG. 1 is a schematic structural diagram of a touch display device according to some embodiments of the present disclosure.
Figure 6:
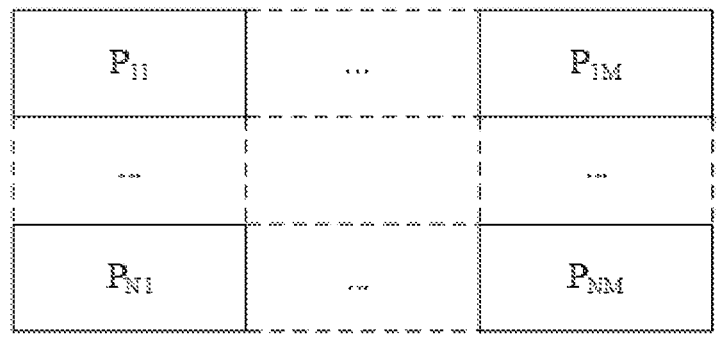
FIG. 6 is a schematic diagram of spliced touch screens of a touch display device according to some embodiments of the present disclosure.

In an aspect, embodiments of the present disclosure provide a touch display device. The touch display device is formed by at least two spliced touch screens, and a shape of the touch display device is determined by a user according to use requirements and is not limited herein; in some examples, as shown in FIG. 6, the touch display device includes N*M spliced touch screens (i.e., $P_{11}, \ldots, P_{1M}, \ldots, P_{N1}, \ldots, P_{NM}$), where M is a total number of columns of the touch screens of the touch display device, and N is a total number of rows of the touch screens. As shown in FIG. 1, the touch display device includes an obtaining module 11 and a processing module 12.

The obtaining module 11 is configured to obtain report data of at least one touch screen of the touch display device.

The report data is generated by the at least one touch screen when the at least one touch screen is touched by a user, and may include, for example, a report coordinate. The report coordinate refers to a touch coordinate on the touch screen by the user; and the touch coordinate corresponds to the touch screen, rather than a display area of the touch display device. It can be known that, for a touch screen supporting multi-touch, there may be more than one report coordinate.

The processing module 12 is configured to perform coordinate conversion according to a splicing state and the report data of the touch screen sending the report data, to obtain at least one output coordinate corresponding to an entire display area of the touch display device, and the output coordinate is for executing a touch instruction.

According to the embodiments of the present disclosure, report data of each touch screen is converted into a corresponding output coordinate in the entire display area, such that touch identification for the entire touch display device is realized, a use benefit of the spliced display device is improved, and therefore, the spliced display device brings a higher practical value.

The touch display device of the embodiments of the present disclosure will be described in detail below.

In some embodiments of the present disclosure, the touch display device includes:

a configuration module, configured to configure identification information for each touch screen of the touch display device before the report data of the at least one touch screen of the touch display device is obtained.

Specifically, identification information configured for the each touch screen corresponds to a splicing position of the each touch screen in the touch display device. Touch screens of the touch display device may be spliced flexibly, for example, through changing splicing positions of some touch screens, or increasing or decreasing the number of touch screens of the touch display device. Configuration of identification information may be performed for the touch screens, while splicing of the touch screens is completed. A splicing position of each touch screen can be determined based on the identification information of the each touch screen, such that report data of the touch screen can be accurately converted into an output coordinate corresponding to the entire display area.

When the identification information is configured, the output coordinate with respect to the entire display area may be determined according to the report data of the touch screen.

Specifically, the processing module 12 may determine a splicing position of a touch screen according to identification information of the touch screen to which the report data belongs, and then perform coordinate conversion according to the report data and the determined splicing position to obtain at least one output coordinate corresponding to the report data.

As an example, it is assumed that the touch display device is formed by four spliced touch screens, which are respectively located at four splicing positions including an upper left splicing position, a lower left splicing position, an upper right splicing position and a lower right splicing position.

Assuming that identification information for a touch screen at the upper left position is L1 through configuring identification information, upon receiving report data of the touch screen corresponding to L1, the processing module 12 may perform coordinate conversion according to a report coordinate in the report data and an upper left position of the touch screen corresponding to L1 in an entire display area, to obtain an output coordinate of the report coordinate with respect to the entire display area.

When determining the output coordinate, the output coordinate may be further calibrated, in order to ensure an accuracy of touch recognition.

That is, in some embodiments of the present disclosure, the processing module is configured to:

obtaining a corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function. As described above, the report data may include the report coordinate which refers to a touch coordinate on the touch screen by the user, and the touch coordinate corresponds to the touch screen, rather than the entire display area of the touch display device. That is, the abscissa represented by $R_j$ is an abscissa in a coordinate system established based on the touch screen sending the report data, and the ordinate represented by the $R_i$ is an ordinate in coordinate system established based the touch screen sending the report data.

Through repeated practices, it is proved that an offset error existing in the output coordinate may be weakened through the formula.

Or, in some embodiment, the processing module is configured to obtain the corrected output coordinate according to the following formula:

$$\begin{cases} x = x_{MAX} \cdot (M-j)/M + (R_j/M) \\ y = y_{MAX} \cdot (N-i)/N + (R_i/N) \end{cases};$$

in the formula, $x_{MAX}$ refers to an upper limit of the abscissa of the report data of the touch screen sending the report data, and $y_{MAX}$ refers to an upper limit of the ordinate of the report data of the touch screen sending the report data. That is, $x_{MAX}$ is a maximum value of an abscissa of a single touch screen, and $y_{MAX}$ is a maximum value of an ordinate of the single touch screen.

After the output coordinate is corrected, a touch instruction may be executed based on the output coordinate.

Correspondingly, in some embodiments of the present disclosure, the touch display device further includes:

an output module, configured to convert the output coordinate into a data format compatible with a control board, and output to the control board such that the control board executes a touch operating instruction corresponding to the output coordinate.

The control board is a main board, which may pre-store a mapping relationship between output coordinate and touch operating instruction. According to the mapping relationship, the control board determines and executes the corresponding touch operating instruction.

For example, in an entire display interface of the touch display device, an icon for an interface exit option falls on a touch screen A. The control board pre-stores a mapping relationship between a coordinate (which may be either one pre-set coordinate or multiple pre-set coordinates) of the icon for the interface exit option relative to the entire display area and an interface exit instruction.

In a case that the user touches the touch screen A, the touch screen A sends report data, and the processing module 12 performs coordinate conversion according to the report data from the touch screen A to determine an output coordinate of the touch position in the display area. When the output coordinate is a coordinate having a mapping relationship with the interface exit instruction, the interface exit instruction is correspondingly executed.

The touch display device of the embodiments of the present disclosure will be described hereinafter by way of example with reference to practical applications.

In some practical applications, touch screens of the touch display device according to the embodiments of the present disclosure are connected to each other in series, and each touch screen is provided with one obtaining module and one processing module.

Figure 7:
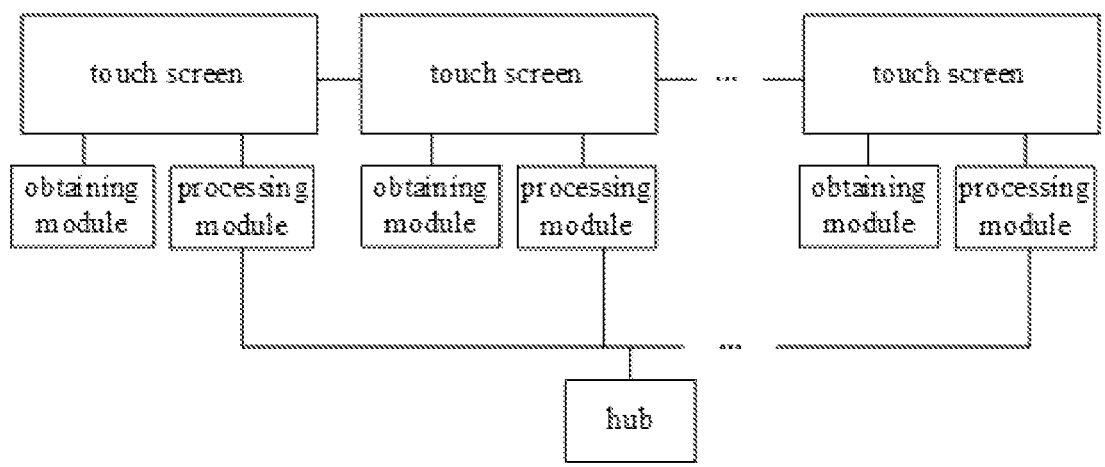
FIG. 7 is a schematic diagram showing a logical structure of a touch display device according to some embodiments of the disclosure.

In the touch display device of the embodiments of the disclosure, the processing modules of the touch screens are connected to a hub, and the hub is the output module described above. Reference may be made to FIG. 7 for a schematic diagram showing a logical structure of the touch display device.

After the configuration module configures the identification information for each touch screen, each touch screen obtains an output coordinate of report data of the each touch screen corresponding to the entire display area through converting based on the report data of the each touch screen and a splicing position of the each touch screen corresponding to the identification information, and corrects the obtained output coordinate. After the output coordinate is corrected, the corrected coordinate is sent to the hub.

The hub is for collecting the corrected output coordinate sent by each touch screen, converting the corrected output coordinate into a data format compatible with the control board and sending to the control board, such that the control board executes a touch operating instruction corresponding to the output coordinate.

The control board may adopt a plug-and-play operation mode, and may directly execute a corresponding touch operating instruction according to the output coordinate; or, the control board may also adopt a non-plug-and-play operation mode, and a corresponding touch operating instruction only may be executed according to the output coordinate when a corresponding driver program is installed.

In general, different touch display devices may adopt different coordinate conversion methods. When the control board is installed with different drivers, different touch recognition may be flexibly applied.

Figure 8:
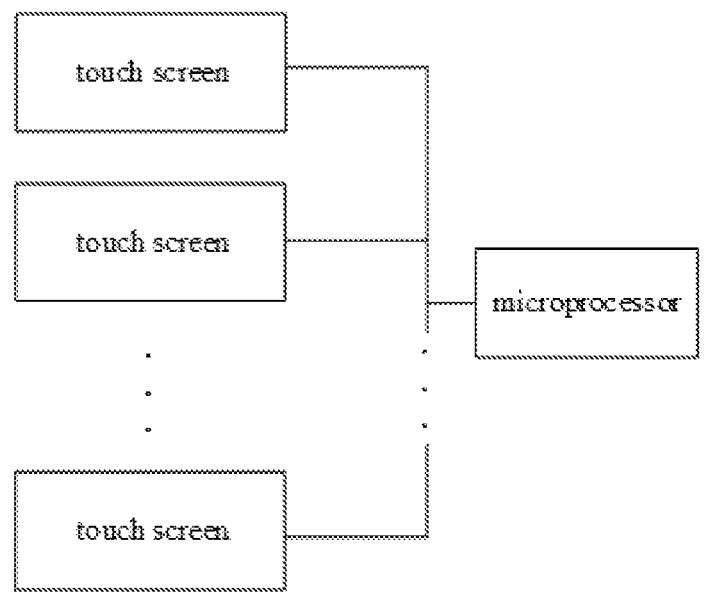
FIG. 8 is a schematic diagram showing a logical structure of a touch display device according to some embodiments of the disclosure.

In some practical applications, the touch screens of the touch display device according to the embodiments of the present disclosure are connected to each other in parallel. The obtaining module, the processing module and the output module are implemented as a microprocessor. Reference may be made to FIG. 8 for a schematic diagram showing a logical structure of the touch display device.

After identification information is configured by the configuration module for each touch screen, and report data is generated by the each touch screen, the report data combined with the identification information is directly sent to the microprocessor, and the microprocessor performs coordinate conversion of the report data to obtain an output coordinate. Then the microprocessor corrects the output coordinate, converts the corrected output coordinate into a data format compatible with the control board and sends the converted output coordinate to the control board, such that the control board executes a touch operating instruction corresponding to the output coordinate.

Figure 2:
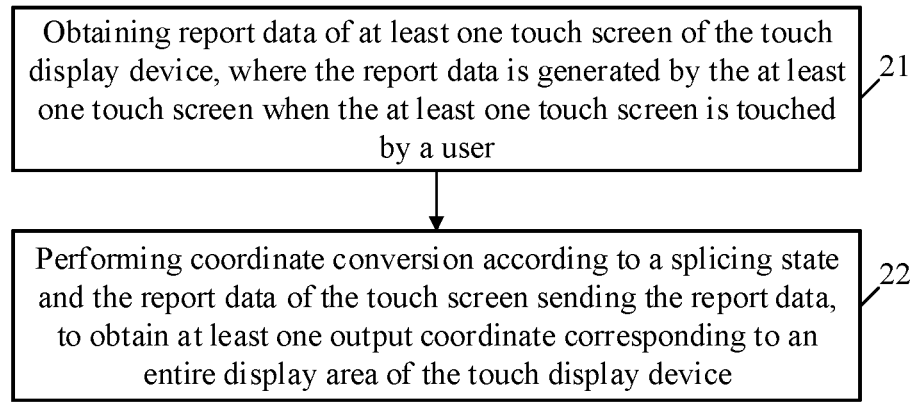
FIG. 2 is a schematic flow chart of a method for touch detection according to some embodiments of the disclosure.

In another aspect, embodiments of the present disclosure further provide a method for touch detection, which is applied to the touch display device. The touch display device is formed by at least two spliced touch screens, and a shape of the touch display device is determined by a user according to use requirements and is not limited herein. As shown in FIG. 2, the method for touch detection includes step 21 to step 22.

In step 21, report data of at least one touch screen of the touch display device is obtained, where the report data is generated by the at least one touch screen when the at least one touch screen is touched by a user.

In step 22, coordinate conversion is performed according to a splicing state and the report data of the touch screen sending the report data, to obtain at least one output coordinate corresponding to an entire display area of the touch display device.

It can be seen that, the touch display device according to the above embodiments of the present disclosure may be an executive body of the method for touch detection according to the embodiments of the present disclosure, thus the technical effect achieved by the touch display device can also be realized by the method for touch detection.

The method for touch detection of the embodiments of the present disclosure will be described in detail below.

Specifically, the method for touch detection further includes step 20.

In step 20, identification information is configured for each touch screen of the touch display device before the report data of the at least one touch screen of the touch display device is obtained.

Specifically, the identification information configured for the each touch screen corresponds to a splicing position of the each touch screen in the touch display device. Touch screens of the touch display device may be spliced flexibly, for example, through changing splicing positions of some touch screens, or increasing or decreasing the number of touch screens of the touch display device. Configuration of identification information may be performed for touch screens, when splicing of the touch screens is completed. A splicing position of each touch screen may be determined based on the identification information of the each touch screen, such that report data of the each touch screen may be accurately converted into an output coordinate corresponding to the entire display area. In a case that the identification information is configured, the output coordinate with respect to the entire display area may be determined according to the report data.

Specifically, in the embodiments of the present disclosure, when the above steps are performed, a splicing position of a touch screen is determined according to identification information of the touch screen to which report data belongs, and then coordinate conversion is performed according to the report data and the determined splicing position to obtain at least one output coordinate corresponding to the report data.

As an example, it is assumed that the touch display device is formed by four spliced touch screens, which are respectively located at four splicing positions including an upper left splicing position, a lower left splicing position, an upper right splicing position and a lower right splicing position.

Assuming that identification information for a touch screen at the upper left position is L1 through configuring identification information, upon receiving report data of the touch screen corresponding to L1, the processing module 12 may perform coordinate conversion according to a report coordinate in the report data and an upper left position of the touch screen corresponding to L1 in an entire display area, to obtain an output coordinate of the report coordinate with respect to the entire display area.

After the output coordinate is determined, the output coordinate may be further calibrated, in order to ensure an accuracy of touch recognition.

That is, in some embodiments of the present disclosure, the step 22 may specifically include:

obtaining the corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

Through repeated practices, it is proved that an offset error existing in the output coordinate may be weakened through the formula.

After the output coordinate is corrected, a touch instruction may be executed based on the corrected output coordinate.

Correspondingly, in some embodiments of the present disclosure, the method for touch detection further includes step 23.

In the step 23, the output coordinate is converted into a data format compatible with a control board, and is outputted to the control board, such that the control board executes a touch operating instruction corresponding to the output coordinate.

The control board pre-stores a mapping relationship between an output coordinate and a touch operating instruction, determines a touch operating instruction corresponding to the output coordinate according to the mapping relationship, and executes the touch operating instruction.

For example, in an entire display interface of the touch display device, an interface exit option falls on a touch screen A. The control board pre-stores a coordinate (which may be either one pre-set coordinate or multiple pre-set coordinates) of the interface exit option relative to the entire display area.

In a case that the user touches the touch screen A, the touch screen A sends report data, and the method for touch detection performs coordinate conversion according to the report data from the touch screen A to determine an output coordinate of the touch position corresponding to the display area. When the output coordinate is the coordinate stored by the control board for the interface exit option, the touch instruction corresponding to the interface exit option is correspondingly executed.

The method for touch detection of the embodiments of the present disclosure will be described hereinafter by way of example with reference to practical applications.

In some practical applications, the touch screens of the touch display device according to the embodiments of the present disclosure are connected to each other in series, and each touch screen is configured with one obtaining module and one processing module.

In the touch display device of the embodiments of the disclosure, a hub is connected to the processing module of each touch screen, and the hub is the output module described above.

Figure 3:
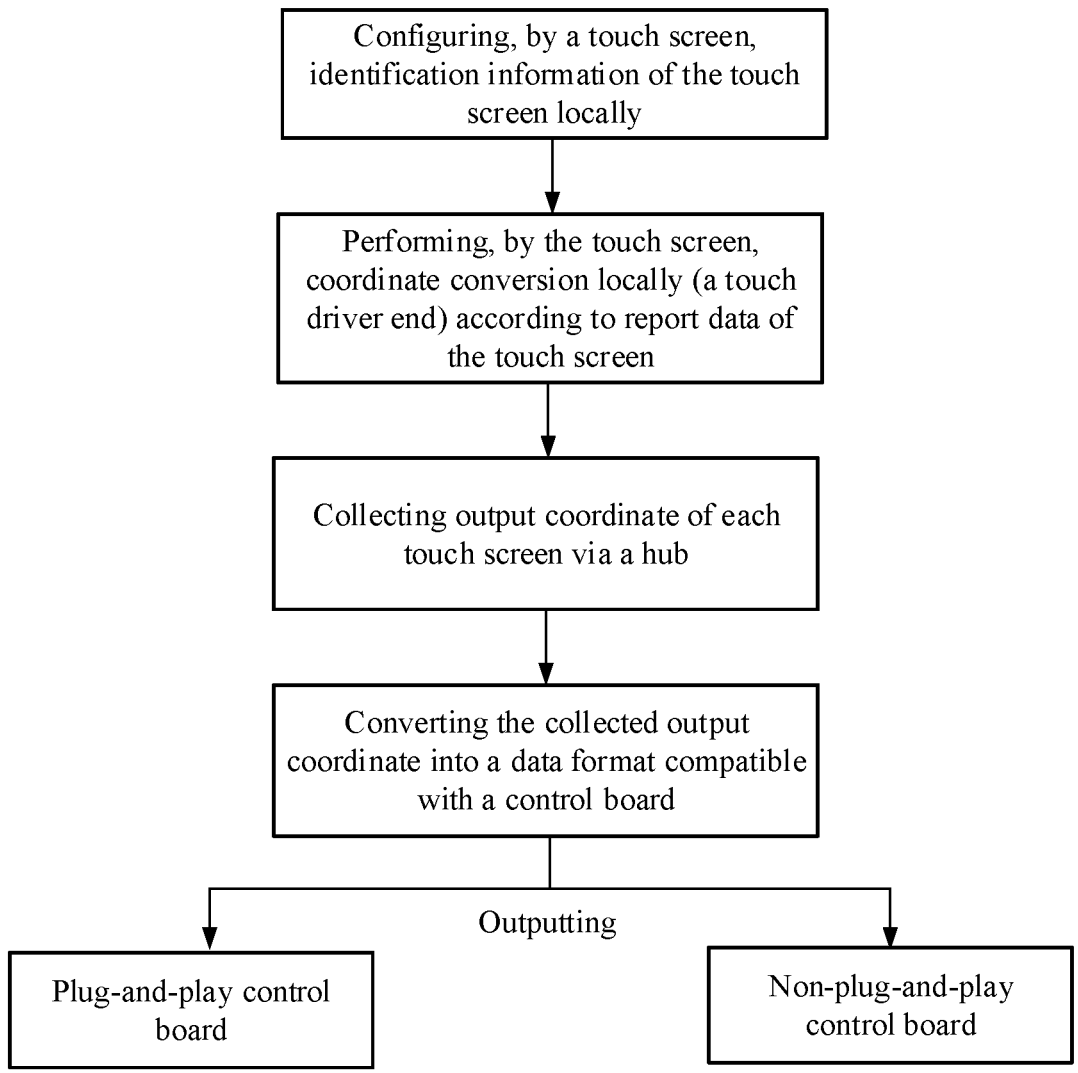
FIG. 3 is a schematic flow chart of a method for touch detection according to some embodiments of the disclosure in a practical application.

As shown in FIG. 3, a method for touch detection of the embodiments of the present disclosure includes:

configuring, by a touch screen, identification information of the touch screen locally;

performing, by the touch screen, coordinate conversion locally (that is, a touch driver end) according to report data of the touch screen;

collecting output coordinate of each touch screen via a hub;

converting the collected output coordinate into a data format compatible with a control board; and outputting the converted output coordinate to the control board.

The identification information may be an ID identifier associated with a splicing position.

The performing, by the touch screen, coordinate conversion locally according to report data of the touch screen may include:

reading an address number of a report coordinate (Rj,Ri) which is local; and performing coordinate conversion according to the report coordinate (Rj, Ri) to obtain an output coordinate, which may specifically include: obtaining the corrected output coordinate according to a formula $$\begin{cases} x = (M-j)/M + \text{Int}(R_j/M) \\ y = (N-i)/N + \text{Int}(R_i/N) \end{cases};$$

A data signal type of the output coordinate includes but not limited to USB (Universal Serial Bus) data, I2C (I2C is a simple, two-way two-wire synchronous serial bus developed by Philips), SPI (Serial Peripheral Interface) data and the like.

The control board may be either a plug-and-play control board or a non-plug-and-play control board (for which a driver is required to be installed).

In some practical applications, touch screens of the touch display device provided by the embodiments of the disclosure are connected to each other in parallel, and the obtaining module, the processing module and the output micromodule are implemented as a microprocessor connected with each of the touch screens.

That is, each touch screen directly sends generated report data to the microprocessor respectively, and the microprocessor performs coordinate conversion of the report data for each touch screen to obtain an output coordinate. Further, the microprocessor may further correct the output coordinate, convert the corrected output coordinate into a data format compatible with the control board and send to the control board, such that the control board executes a touch operating instruction corresponding to the output coordinate.

Figure 4:
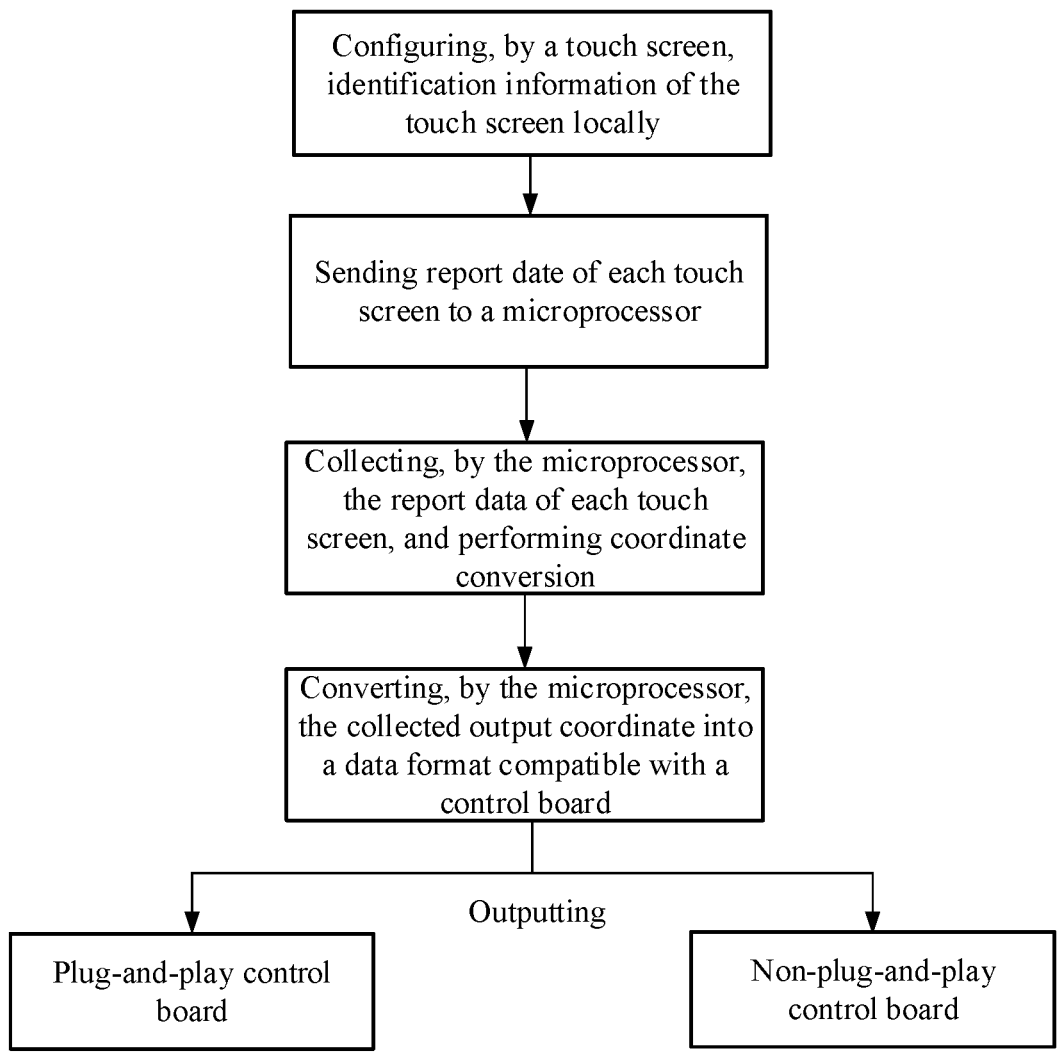
FIG. 4 is a schematic flow chart of a method for touch detection according to some embodiments of the disclosure in a practical application.

As shown in FIG. 4, a method for touch detection includes:

configuring, by a touch screen, identification information of the touch screen locally;

sending report date of each control screen to a microprocessor;

collecting, by the microprocessor, the report data of each touch screen, and performing coordinate conversion;

converting, by the microprocessor, the collected output coordinate into a data format compatible with a control board; and sending the converted output coordinate to the control board.

The identification information may be an ID identifier associated with a splicing position.

The microprocessor may be one of an MCU (micro control unit), a CPU (central processing unit), an MOC (main operation controller) or may be a set of at least one of the foregoing. The report data includes but is not limited to RS232 interface data, RS422 interface data, RS485 interface data, or UART (Universal Asynchronous Receiver and Transmitter) data, SSI (Synchronous Serial Interface) data, CAN (Controller Area Network) data and the like.

The collecting, by the microprocessor, report data of the each touch screen and performing coordinate conversion may include: performing coordinate transformation according to a report coordinate (Rj, Ri) in the report data to obtain an output coordinate, which may specifically include: obtaining the corrected output coordinate according to a formula $$\begin{cases} x = (M-j)/M + \text{Int}(R_j/M) \\ y = (N-i)/N + \text{Int}(R_i/N) \end{cases};$$

The control board may be either a plug-and-play control board or a non-plug-and-play control board (in which a driver is required to be installed).

Figure 5:
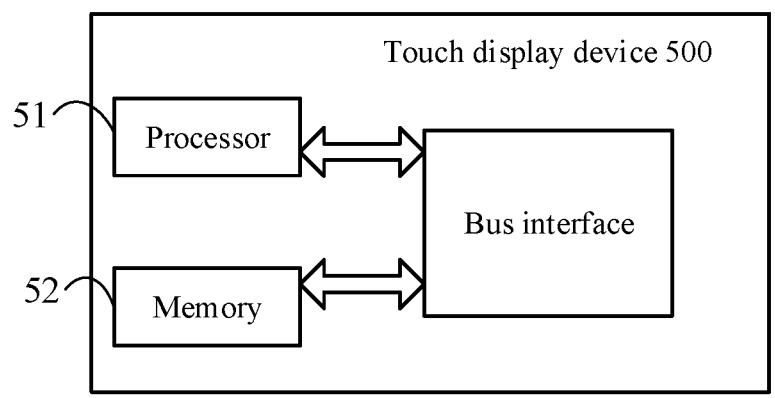
FIG. 5 is a schematic diagram showing a logical structure of a touch display device according to some embodiments of the disclosure.

In addition, as shown in FIG. 5, another embodiment of the present disclosure further provides a touch display device 500, including a processor 51, a memory 52, and a computer program stored in the memory 52 and executable by the processor. When the computer program is executed by the processor 51, the computer program implements following steps:

obtaining report data of at least one touch screen of the touch display device, where the report data is generated by the at least one touch screen when the at least one touch screen is touched by a user; and performing coordinate conversion according to a splicing state and the report data of the touch screen sending the report data, to obtain at least one output coordinate corresponding to an entire display area of the touch display device.

The processor 51 and the memory 52 are connected through a bus interface. The bus interface may include any number of interconnected buses and bridges. Various circuits of one or more processors represented by the processor 51 and a memory represented by the memory 52 are linked together. The bus architecture may also link together various other circuits such as a peripheral device, a voltage regulator, a power management circuit and the like, which is well known in the art, and therefore will not be further described herein.

In some embodiments of the present disclosure, the computer program, when executed by the processor 51, may implement the following step:

obtaining the corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

In some embodiments of the present disclosure, the computer program, when executed by the processor 51, may implement the following step:

configuring identification information for each touch screen of the touch display device before the report data of the at least one touch screen of the touch display device is obtained.

The step of the processor 51 performing coordinate conversion according to a splicing state and the report data of the touch screen includes:

determining, according to the identification information of the touch screen to which the report data belongs, a splicing position of the touch screen, and performing coordinate conversion according to the report data and the determined splicing position to obtain at least one output coordinate corresponding.

In some embodiments of the present disclosure, the computer program, when executed by the processor 51, further implements the following step:

converting the output coordinate into a data format compatible with a control board and outputting to the control board, such that the control board executes a touch operating instruction corresponding to the output coordinate;

the control board pre-stores a mapping relationship between an output coordinate and a touch operating instruction, determines a touch operating instruction corresponding the output coordinate according to the mapping relationship, and executes the touch operating instruction.

In addition, another embodiment of the present disclosure provides a computer-readable storage medium having a computer program stored thereon, the computer program, when executed by a processor, implements following steps:

obtaining report data of at least one touch screen of the touch display device, where the report data is generated by the at least one touch screen when the at least one touch screen is touched by a user; and performing coordinate conversion according to a splicing state and the report data of the touch screen sending the report data, to obtain at least one output coordinate corresponding to an entire display area of the touch display device.

In some embodiments of the present disclosure, the computer program, when executed by the processor, may implement the following step:

obtaining the corrected output coordinate according to a formula $$\begin{cases} x = (M-j)/M + \text{Int}(R_j/M) \\ y = (N-i)/N + \text{Int}(R_i/N) \end{cases};$$

in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

In some embodiments of the present disclosure, the computer program, when executed by the processor, further implements following steps:

configuring identification information for each touch screen of the touch display device before the report data of the at least one touch screen of the touch display device is obtained.

The computer program is executed by the processor to realize the performing the coordinate conversion according to the splicing state and the report data of the touch screen, which specifically includes:

determining, according to the identification information of the touch screen to which the report data belongs, a splicing position of the touch screen, and performing coordinate conversion according to the report data and the determined splicing position to obtain at least one output coordinate.

In some embodiments of the present disclosure, the computer program, when executed by the processor, further implements following steps:

converting the output coordinate into a data format compatible with a control board and outputting to the control board, such that the control board executes a touch operating instruction corresponding to the output coordinate;

the control board pre-stores a mapping relationship between an output coordinate and a touch operating instruction, determines a touch operating instruction corresponding to the output coordinate according to the mapping relationship, and executes the touch operating instruction.

The above embodiments are merely optional embodiments of the present disclosure. It should be noted that various improvements and modifications may be made by those skilled in the art without departing from the principle of the present disclosure, and these improvements and modifications shall also fall within the scope of the present disclosure.

Unless otherwise defined, any technical or scientific terms used in the present disclosure shall have the common meaning understood by a person of ordinary skills. Term such as "including" and the like in the present disclosure means that an element or an article preceding the term contains an element or an article or an equivalent thereof behind the term, and does not exclude existence of other elements or articles.

What is claimed is:

1. A touch display device, comprising:
at least two spliced touch screens;
an obtaining circuit, configured to acquire report data of at least one touch screen of the touch display device, wherein the report data is generated by the at least one touch screen when the at least one touch screen is touched; and
a processing circuit, configured to perform coordinate conversion according to a splicing state and the report data of the touch screen sending the report data, to obtain at least one output coordinate corresponding to an entire display area of the touch display device;
wherein performing coordinate conversion according to a splicing state and the report data of the touch screen sending the report data, to obtain at least one output coordinate corresponding to an entire display area of the touch display device comprises:
obtaining corrected output coordinate according to a formula $$\begin{cases} x = (M-j)/M + \text{Int}(R_j/M) \\ y = (N-i)/N + \text{Int}(R_i/N) \end{cases};$$

where, in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

2. The touch display device according to claim 1, wherein
the at least two touch screens of the touch display device are connected to each other in series, and each of the at least two touch screens is configured with one obtaining circuit and one processing circuit; and
the performing coordinate conversion according to a splicing state and the report data of the touch screen sending the report data comprises: performing, by the touch screen locally, the coordinate conversion according to the report data of the touch screen, via the processing circuit.

3. The touch display device according to claim 2, further comprising:
a configuration circuit, configured to configure identification information for each touch screen of the touch display device;
wherein the performing coordinate conversion according to a splicing state and the report data of the touch screen sending the report data comprises: determining, according to the identification information of the touch screen to which the report data belongs, a splicing position of the touch screen, and perform coordinate conversion, according to the report data and the splicing position of the touch screen to which the report data belongs, to obtain at least one output coordinate.

4. The touch display device according to claim 2, further comprising:
an output circuit, configured to convert the output coordinate into a data format compatible with a control board, and then output to the control board, such that the control board executes a touch operating instruction corresponding to the output coordinate, and the output circuit comprises a hub connecting the processing circuits of the at least two touch screens;
wherein the control board pre-stores a mapping relationship between an output coordinate and a touch operating instruction, determines the touch operating instruction corresponding to the output coordinate according to the mapping relationship, and executes the touch operating instruction.

5. The touch display device according to claim 1, wherein the at least two touch screens of the touch display device are connected to each other in parallel, and the obtaining circuit and the processing circuit are implemented as a microprocessor connected with the at least two touch screens;
the obtaining report data of at least one touch screen of the touch display device comprises: collecting, by the microprocessor, report data of each of the at least two touch screens; and
the performing coordinate conversion according to a splicing state and the report data of the touch screen sending the report data comprises: performing, by the microprocessor, the coordinate conversion.

6. The touch display device according to claim 5, further comprising:
a configuration circuit, configured to configure identification information for each touch screen of the touch display device;
wherein the performing coordinate conversion according to a splicing state and the report data of the touch screen sending the report data comprises: determining, according to the identification information of the touch screen to which the report data belongs, a splicing position of the touch screen, and perform coordinate conversion, according to the report data and the splicing position of the touch screen to which the report data belongs, to obtain at least one output coordinate.

7. The touch display device according to claim 5, further comprising:
an output circuit, configured to convert the output coordinate into a data format compatible with a control board, and then output to the control board, such that the control board executes a touch operating instruction corresponding to the output coordinate, and the obtaining circuit, the processing circuit and the output circuit are implemented as the microprocessor connected with the at least two touch screen;
wherein the control board pre-stores a mapping relationship between an output coordinate and a touch operating instruction, determines the touch operating instruction corresponding to the output coordinate according to the mapping relationship, and executes the touch operating instruction.

8. A method for touch detection, applied to a touch display device comprising at least two spliced touch screens, comprising:
obtaining report data of at least one touch screen of the touch display device, wherein the report data is generated by the at least one touch screen when the at least one touch screen is touched; and
performing coordinate conversion according to a splicing state and the report data of the touch screen sending the report data, to obtain at least one output coordinate corresponding to an entire display area of the touch display device;
wherein the performing coordinate conversion according to a splicing state and the report data of the touch screen sending the report data, to obtain at least one output coordinate corresponding to an entire display area of the touch display device comprises:
obtaining corrected output coordinate according to a formula $$\begin{cases} x = (M-j)/M + \text{Int}(R_j/M) \\ y = (N-i)/N + \text{Int}(R_i/N) \end{cases};$$

where, in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

9. The method for touch detection according to claim 8, further comprising:
configuring identification information for each touch screen of the touch display device before the report data of the at least one touch screen of the touch display device is acquired;
wherein the performing coordinate conversion according to a splicing state and the report data of the touch screen comprises:
determining, according to the identification information of the touch screen to which the report data belongs, a splicing position of the touch screen, and performing coordinate conversion, according to the report data and the splicing position of the touch screen to which the report data belongs, to obtain at least one output coordinate.

10. The method for touch detection according to claim 8, further comprising:
converting the output coordinate into a data format compatible with a control board and then outputting to the control board, such that the control board executes a touch operating instruction corresponding to the output coordinate;
wherein the control board pre-stores a mapping relationship between an output coordinate and a touch operating instruction, determines the touch operating instruction corresponding to the output coordinate according to the mapping relationship, and executes the touch operating instruction.

11. The method for touch detection according to claim 8, wherein the at least two touch screens of the touch display device are connected to each other in series;
the performing coordinate conversion according to a splicing state and the report data of the touch screen sending the report data comprises: performing, by the touch screen locally, the coordinate conversion according to the report data of the touch screen.

12. The method for touch detection according to claim 8, wherein the at least two touch screens of the touch display device are connected to each other in parallel, and the touch display device further comprises a processor connected with the at least two touch screens;

the obtaining report data of at least one touch screen of the touch display device comprises: collecting, by the processor, report data of each of the at least two touch screens; and the performing coordinate conversion according to a splicing state and the report data of the touch screen sending the report data comprises: performing, by the processor, the coordinate conversion.

13. A non-transitory computer readable storage medium, having a program stored thereon, wherein the method for touch detection according to claim 8 is implemented, when the program is executed by a processor.

14. The non-transitory computer readable storage medium according to claim 13, wherein the method for touch detection further comprises:

converting the output coordinate into a data format compatible with a control board and then outputting to the control board, such that the control board executes a touch operating instruction corresponding to the output coordinate;

wherein the control board pre-stores a mapping relationship between an output coordinate and a touch operating instruction, determines the touch operating instruction corresponding to the output coordinate according to the mapping relationship, and executes the touch operating instruction.

15. The non-transitory computer readable storage medium according to claim 13, wherein the method for touch detection further comprises:

configuring identification information for each touch screen of the touch display device before the report data of the at least one touch screen of the touch display device is acquired;

wherein the performing coordinate conversion according to a splicing state and the report data of the touch screen comprises:

determining, according to the identification information of the touch screen to which the report data belongs, a splicing position of the touch screen, and performing coordinate conversion, according to the report data and the splicing position of the touch screen to which the report data belongs, to obtain at least one output coordinate.

16. A touch display device, comprising: at least two spliced touch screens, a processor, a memory, and a program stored in the memory and executable by the processor, wherein, when the program is executed by the processor, the following steps are performed:

obtaining report data of at least one touch screen of the touch display device, wherein the report data is generated by the at least one touch screen when the at least one touch screen is touched; and performing coordinate conversion according to a splicing state and the report data of the touch screen sending the report data, to obtain at least one output coordinate corresponding to an entire display area of the touch display device;

wherein the performing coordinate conversion according to a splicing state and the report data of the touch screen sending the report data, to obtain at least one output coordinate corresponding to an entire display area of the touch display device comprises:

obtaining corrected output coordinate according to a formula $$\begin{cases} x = (M - j)/M + \text{Int}(R_j/M) \\ y = (N - i)/N + \text{Int}(R_i/N) \end{cases};$$

where, in the formula, x refers to an abscissa of the corrected output coordinate, y refers to an ordinate of the corrected output coordinate, M refers to a total number of columns of touch screens of the touch display device, N refers to a total number of rows of the touch screens of the touch display device, j refers to a column number of the touch screen sending the report data in the touch display device, i refers to a row number of the touch screen sending the report data in the touch display device, $R_j$ refers to an abscissa of the report data, $R_i$ refers to an ordinate of the report data and Int refers to rounding function.

17. The touch display device according to claim 16, wherein, when the program is executed by the processor, the following steps are performed:

configuring identification information for each touch screen of the touch display device before the report data of the at least one touch screen of the touch display device is acquired;

wherein the performing coordinate conversion according to a splicing state and the report data of the touch screen comprises:

determining, according to the identification information of the touch screen to which the report data belongs, a splicing position of the touch screen, and performing coordinate conversion, according to the report data and the splicing position of the touch screen to which the report data belongs, to obtain at least one output coordinate.

18. The touch display device according to claim 16, wherein, when the program is executed by the processor, the following steps are performed:

converting the output coordinate into a data format compatible with a control board and then outputting to the control board, such that the control board executes a touch operating instruction corresponding to the output coordinate;

wherein the control board pre-stores a mapping relationship between an output coordinate and a touch operating instruction, determines the touch operating instruction corresponding to the output coordinate according to the mapping relationship, and executes the touch operating instruction.

* * * * *